(12) United States Patent
Petrin

(10) Patent No.: US 7,355,955 B2
(45) Date of Patent: Apr. 8, 2008

(54) NANOSCALE DIGITAL DATA STORAGE DEVICE

(75) Inventor: Andrei B. Petrin, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 638 days.

(21) Appl. No.: 10/844,729

(22) Filed: May 13, 2004

(65) Prior Publication Data

US 2005/0018587 A1   Jan. 27, 2005

(30) Foreign Application Priority Data

Jul. 23, 2003   (KR) .................. 10-2003-0050628

(51) Int. Cl.
*G11B 9/00* (2006.01)

(52) U.S. Cl. ...................... 369/126; 369/140

(58) Field of Classification Search .................. 369/126
See application file for complete search history.

(56) References Cited

U.S. PATENT DOCUMENTS

| | | | |
|---|---|---|---|
| 5,537,372 A | | 7/1996 | Albrecht et al. |
| 6,084,849 A * | | 7/2000 | Durig et al. ................. 369/126 |
| 6,249,747 B1 * | | 6/2001 | Binnig et al. .................. 702/33 |
| 6,944,114 B2 * | | 9/2005 | Birecki et al. ............... 369/126 |
| 2002/0168825 A1* | | 11/2002 | Kim et al. ................... 438/287 |
| 2003/0210640 A1* | | 11/2003 | Min et al. .................... 369/126 |
| 2004/0047275 A1* | | 3/2004 | Cherubini et al. ........... 369/126 |
| 2005/0013230 A1* | | 1/2005 | Adelmann .................. 369/101 |
| 2005/0237906 A1* | | 10/2005 | Gibson ........................ 369/126 |

* cited by examiner

*Primary Examiner*—Wayne Young
*Assistant Examiner*—Lixi Chow
(74) *Attorney, Agent, or Firm*—The Farrell Law Firm, PC

(57) ABSTRACT

A nanoscale digital data storage device is provided. In the nanoscale digital data storage device, a storage medium has a polymer layer deposited on a substrate, for writing and reading digital data on and from. A cantilever chip has a plurality of cantilevers arranged therein. Each cantilever is fixed to another substrate at one end and has a tip formed at its free end, for emitting heat according to an applied current. The tips in the cantilever chip are in contact with the storage medium at predetermined bit positions during data writing, and the cantilever chip applies a relatively low current to a tip when the tip writes bit 1 and a relatively high current to the tip when the tip writes bit 0.

6 Claims, 21 Drawing Sheets

NANOSCALE DIGITAL DATA STORAGE DEVICE

PRIORITY

This application claims priority under 35 U.S.C. § 119 to an application entitled "Nanoscale Digital Data Storage Device" filed in the Korean Intellectual Property Office on Jul. 23, 2003 and assigned Serial No. 2003-50628, the contents of which are incorporated herein by reference.

BACKGROUND OF THE INVENTION

1. Field of the Invention

The present invention relates generally to a data storage device, and in particular, to a nanoscale digital data storage device for writing and reading data by mechanical contact.

2. Description of the Related Art

Thomas R. Albrecht, et. al. proposed a data storage system using a cantilever having a tip in U.S. Pat. No. 5,537,372 entitled "High Density Data Storage System with Topographic Contact Sensor". In the data storage system, the tip physically contacts the surface of a storage medium and the medium has pits representing mechanically readable data on its surface. During a read operation, a change of the cantilever position is sensed and interpreted. If the surface of the medium is thermally transformable, data is written on the surface by heating the tip when the tip is brought into contact with the surface and thus forming pits on the surface. The tip is heated by a laser beam.

To improve the tip heating technique, a method has recently been proposed in which a single crystalline silicon cantilever is selectively doped with boron to provide a conductive path in an electrically resistive region near the tip. The tip is heated by flowing current in the conductive path.

These conventional data storage devices are equipped with a means for forcibly transforming or moving cantilevers perpendicularly to the storage medium. For writing a digital bit "1", a corresponding cantilever contacts the medium surface, whereas for writing a digital bit "0", a corresponding cantilever is spaced from the medium surface. Before the data writing, previous pits are eliminated by heating the overall medium surface to a high temperature which restores the surface shape due to surface tension.

A drawback of this writing mechanism is that the data storage device is very complex in structure to forcibly move or transform each cantilever. As more cantilevers are used, more moving means are required. The resulting high cost and low stability render the data storage device infeasible for mass production. Moreover, heating the overall surface of the storage medium before writing is not preferable in terms of energy efficiency.

SUMMARY OF THE INVENTION

It is, therefore, an object of the present invention to provide a nanoscale digital data storage device which is so simply configured as to be suitable for mass production.

It is another object of the present invention to provide a nanoscale digital data storage device with a significantly improved energy efficiency.

The above objects are achieved by a nanoscale digital data storage having a storage medium and a cantilever chip. The storage medium has a polymer layer deposited on a substrate, for writing and reading digital data on and from. The cantilever chip has a plurality of cantilevers arranged therein. Each cantilever is fixed to another substrate at one end and has a tip formed at its free end, for emitting heat according to an applied current. The tips in the cantilever chip are in contact with the storage medium at predetermined bit positions during data writing, and the cantilever chip applies a relatively low current to a tip when the tip writes bit 1 and a relatively high current to the tip when the tip writes bit 0.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
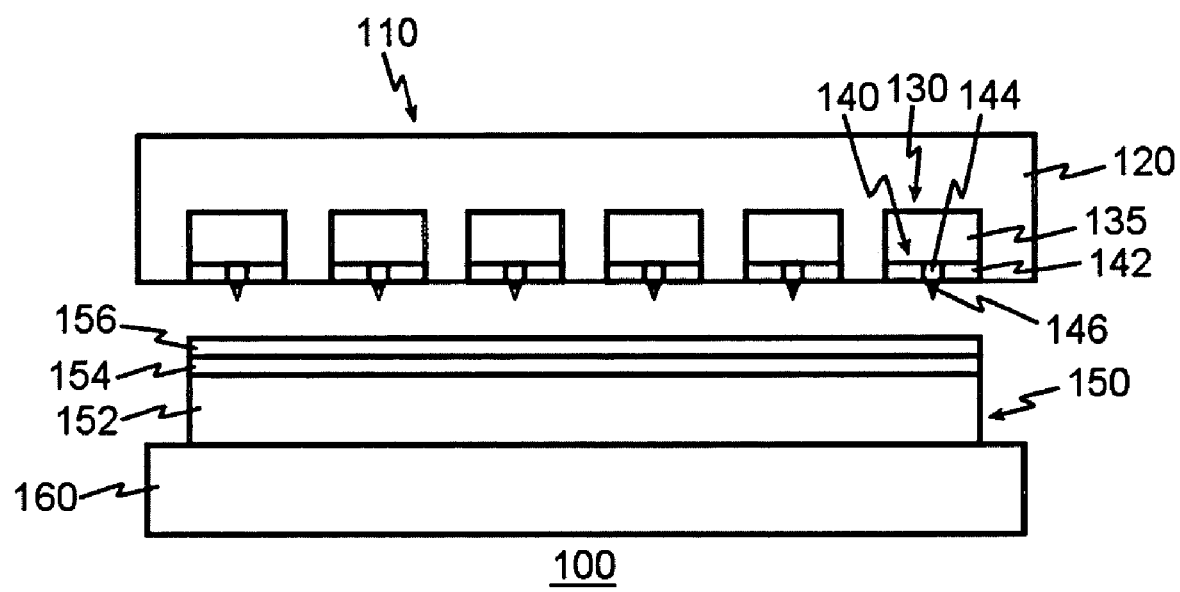
FIG. 1 is a view illustrating the structure of a nanoscale digital data storage device according to the present invention.

FIG. 1 illustrates a nanoscale digital storage device according to an embodiment of the present invention. Referring to FIG. 1, the storage device 100 includes a cantilever chip 110, a storage medium 150, and a stage 160.

The cantilever chip 110 has a plurality of cantilever cells 130 arranged in a matrix. Each of the cantilever cells 130 writes or reads one-bit digital data "1" or "0" on or from the storage medium 150. The cantilever cell 130 includes a cantilever 140 and an underlying empty space 135. The cantilever 140 is comprised of an electrically resistive platform 144 and legs 142 for connecting the platform 144 to a substrate 120. For digital data writing and reading, all tips 146 on the cantilever chip 110 contact the storage medium 150 at predetermined bit positions.

The storage medium 150 is comprised of a substrate 152, a 70 nm cross-linked, 40 nm hard-backed photoresist layer 154 deposited on the substrate 152, and a polymethylmethacrylate (PMMA) layer 156 deposited on the photoresist layer 154.

The storage medium 150 is mounted on the stage 160. The stage 160 moves the storage medium 150 in three-dimensional directions to adjust the relative position of the storage medium 150.

Figure 2A:
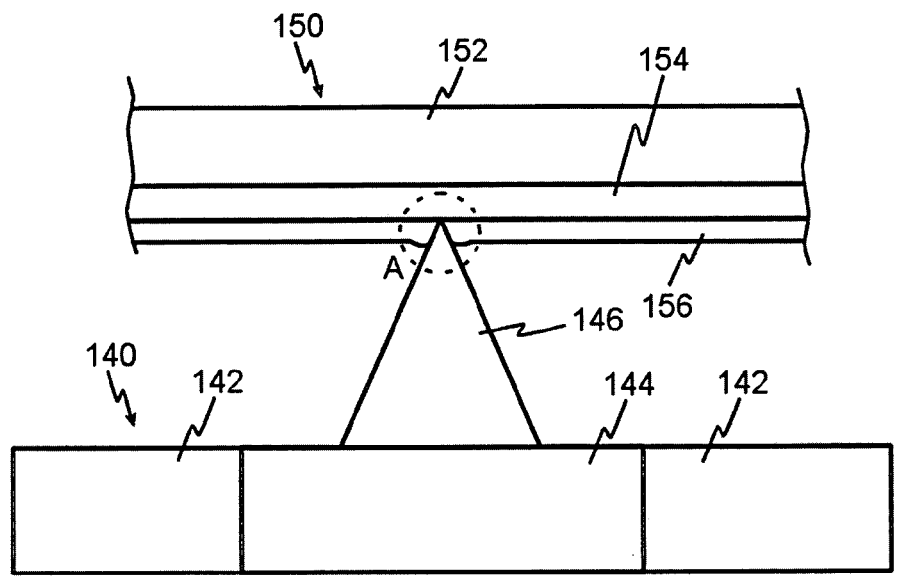
FIG. 2A is a schematic view depicting the digital data writing mechanism of the device illustrated in FIG. 1.
Figure 2B:
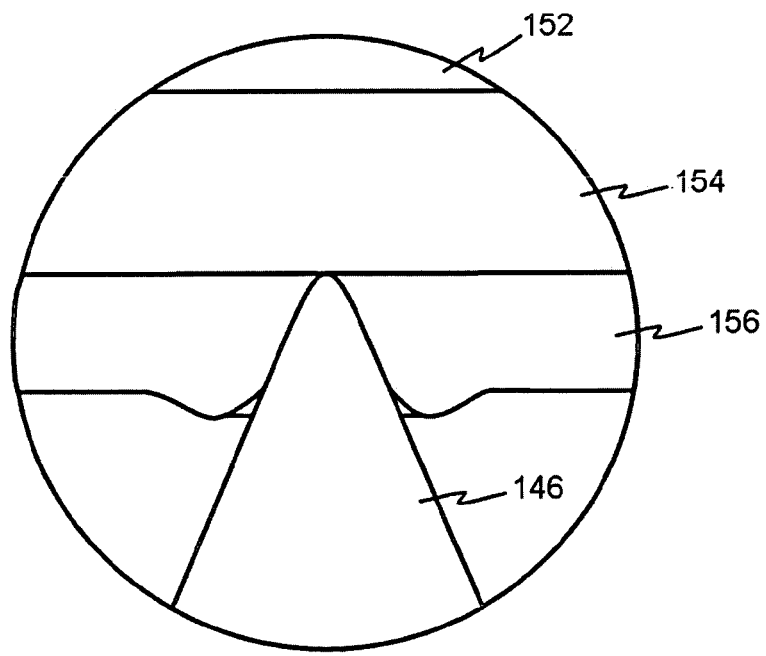
FIG. 2B is an enlarged view of a portion A illustrated in FIG. 2A.

FIG. 2A is a schematic view depicting the digital data writing mechanism of the device illustrated in FIG. 1, and FIG. 2B is an enlarged view of a portion A illustrated in FIG. 2A. Referring to FIGS. 2A and 2B, for writing/reading digital data, the tip 146 of a cantilever 140 contacts the storage medium 150 at a corresponding bit position. Here, the end of the tip 146 contacts the photoresist layer 154 or is near the photoresist layer 154. A bit size is defined as the maximum width of the tip 146 inserted in the PMMA layer 156. The bit size is preferably 40 nm or less. A threshold temperature for bit writing is 350° C. and the spring constant of the cantilever 140 is between 0.01 and 3N/m.

Figure 3A:
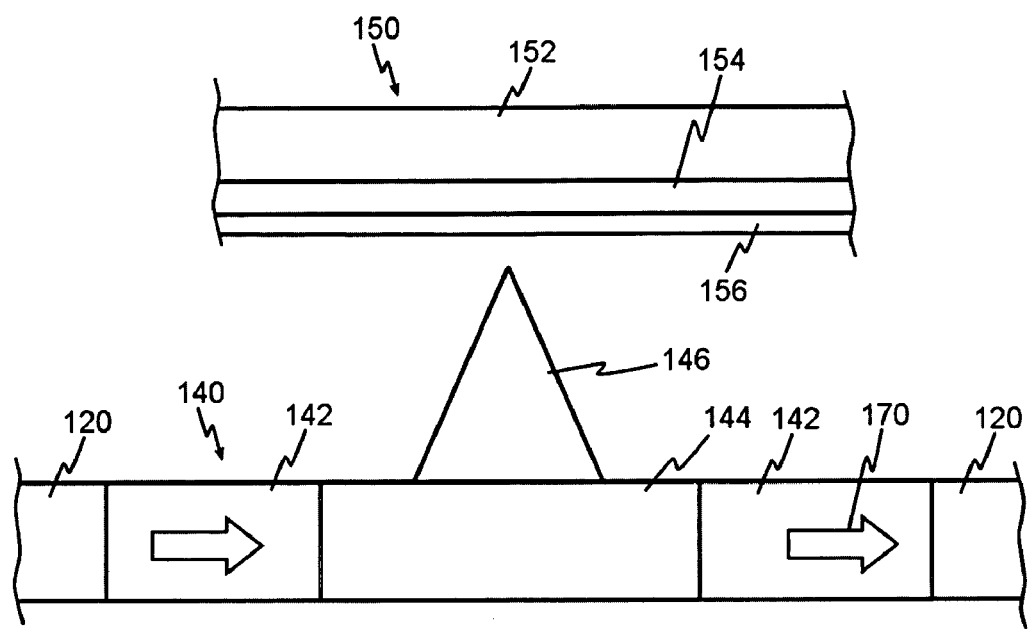
FIGS. 3A, 3B and 3C sequentially illustrate a process of writing a bit "1" in the device illustrated in FIG. 1.
Figure 3B:
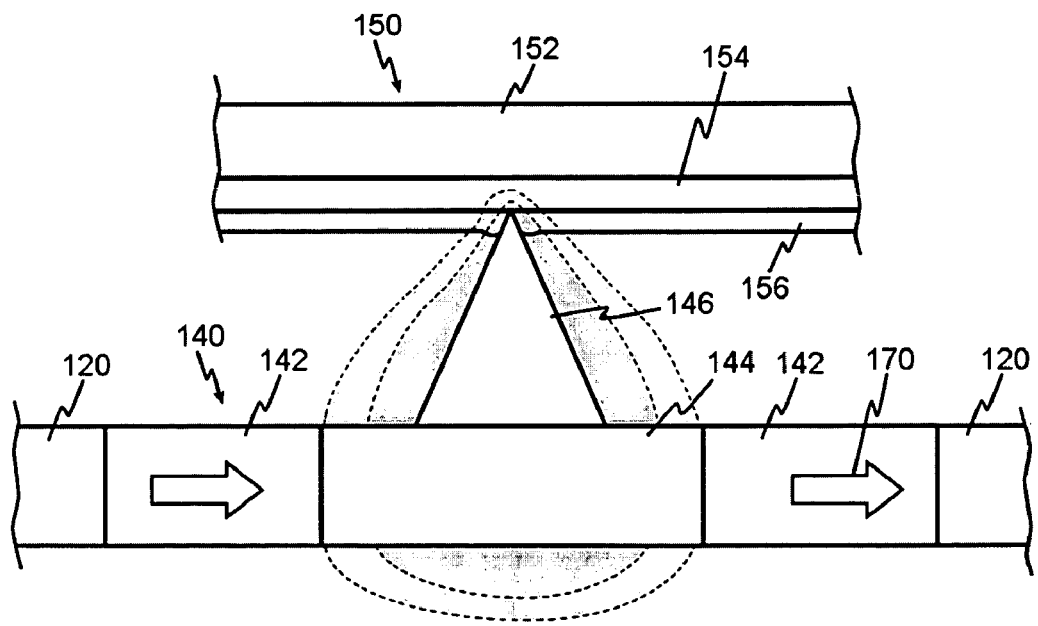
Figure 3C:
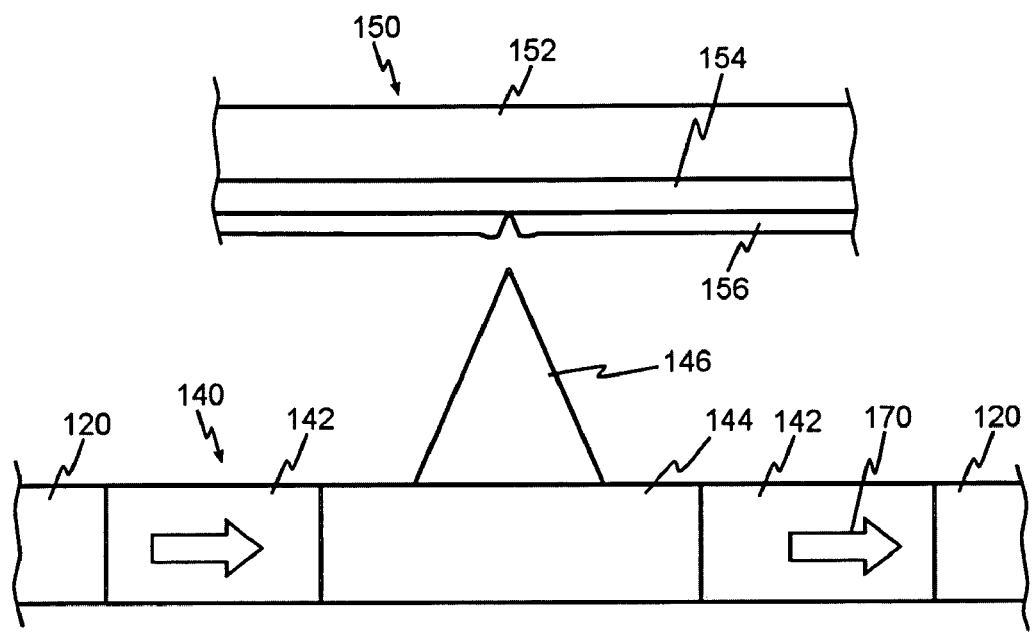

FIGS. 3A, 3B and 3C sequentially illustrate a process of writing a bit "1" in the device illustrated in FIG. 1. FIG. 3A illustrates the tip 146 of the cantilever 140 at its bit position, apart from the storage medium 150. "1" or "0" is written or read at the bit position. As illustrated in FIG. 3A, there is no pit formed at the bit position of the storage medium 150. This implies that "0" has been written at the bit position.

Referring to FIG. 3B, the tip 146 of the cantilever 140 is in contact with the surface of the storage medium 150. Here, the tip 146 is heated at a relatively low temperature.

Referring to FIG. 3C, after writing "1" at the bit position of the storage medium 150, the tip 146 of the cantilever 140 is spaced from the storage medium 150.

Figure 4A:
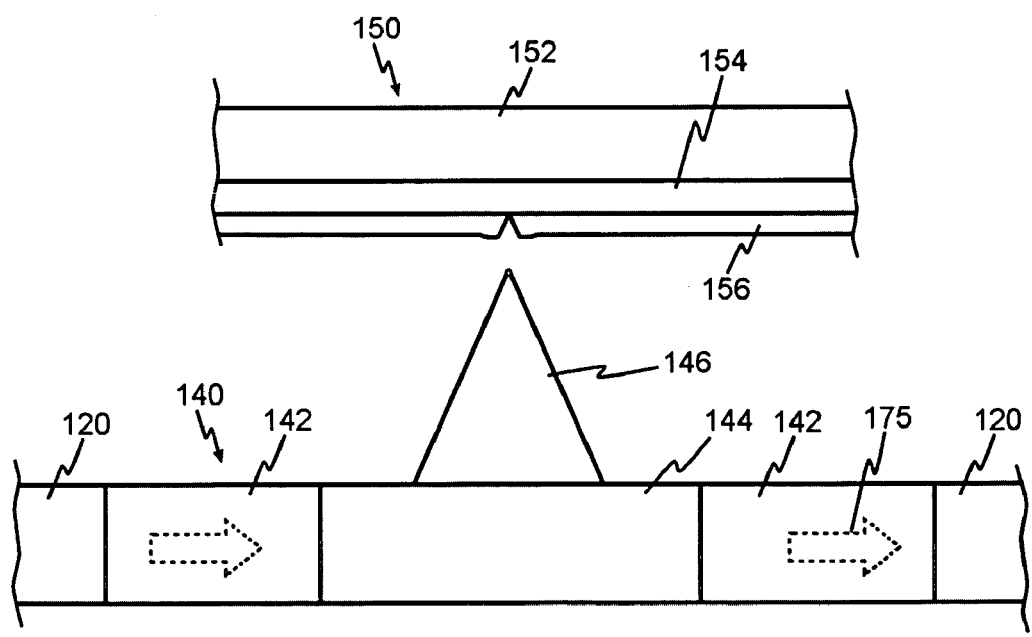
FIGS. 4A, 4B and 4C sequentially illustrate a process of writing a bit "0" in the device illustrated in FIG. 1.
Figure 4B:
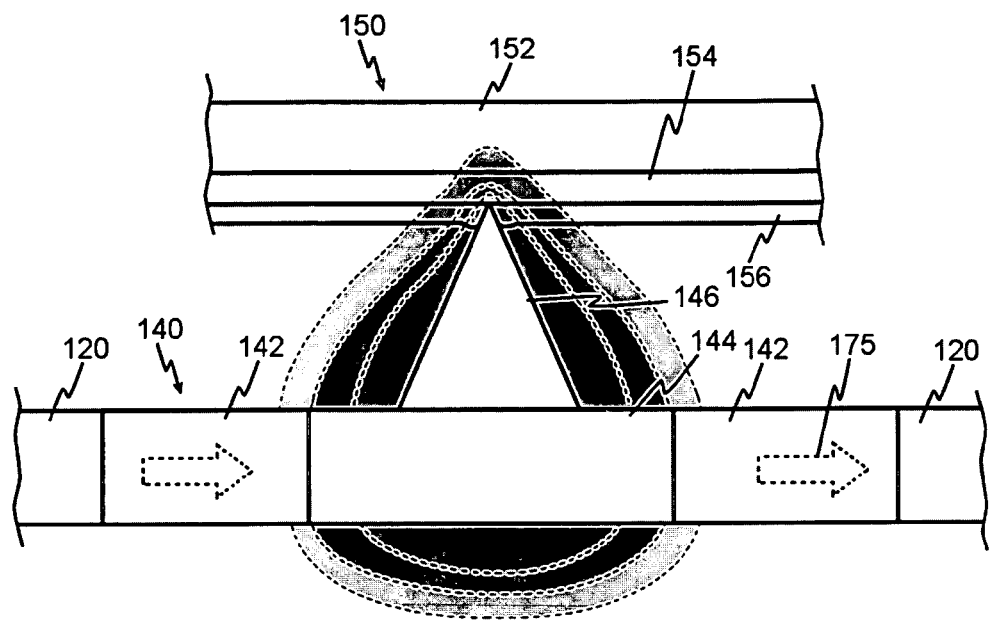
Figure 4C:
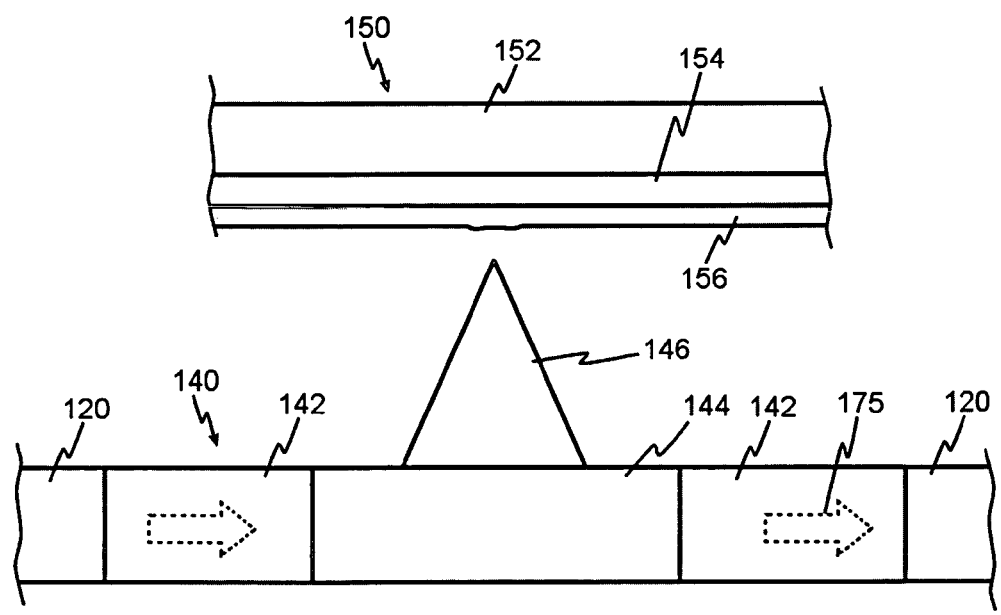

FIGS. 4A, 4B and 4C sequentially illustrate a process of writing a bit "0" in the device illustrated in FIG. 1. FIG. 4A illustrates the tip 146 of the cantilever 140 at its bit position, apart from the storage medium 150. As illustrated, there is a pit formed at the bit position of the storage medium 150. This implies that "1" has been written at the bit position.

Referring to FIG. 4B, the tip 146 of the cantilever 140 is in contact with the surface of the storage medium 150. Here, the tip 146 is heated at a relatively high temperature. The level of a current 175 applied for writing "0" is higher than that of a current 170 applied for writing "1". If the temperature of the tip 146 is substantially higher than the softening temperature of the PMMA layer 156, the surface tension of the PMMA layer 156 causes the pit to be buried. This phenomenon appears when the surface tension is sufficiently high. The surface tension increases as the bit size decreases. In this context, it is preferable to set the bit size to 100 nm or less.

Referring to FIG. 4C, after writing "0" at the bit position of the storage medium 150, the tip 146 of the cantilever 140 is spaced from the storage medium 150.

Figure 5A:
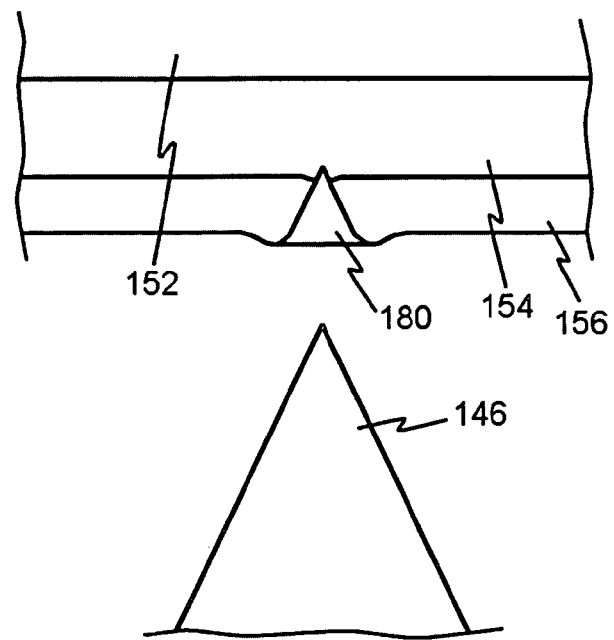
FIGS. 5A and 5B illustrate bits "1" and "0" written by the device illustrated in FIG. 1.
Figure 5B:
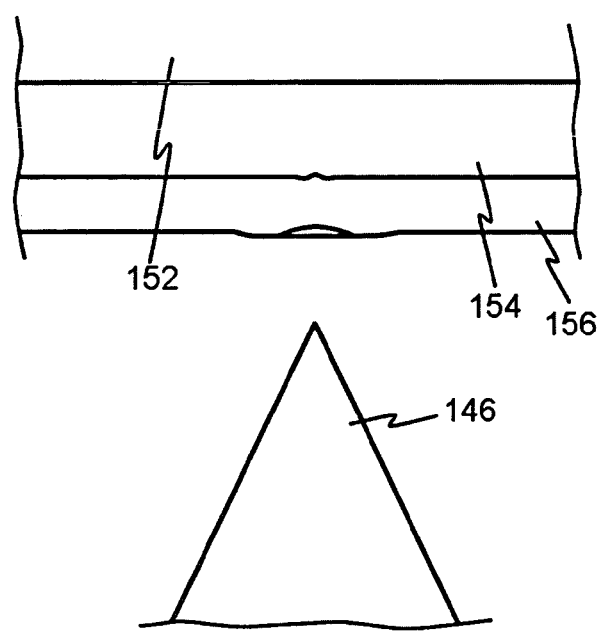

FIGS. 5A and 5B illustrate bits "1" and "0" written by the device illustrated in FIG. 1, respectively. When "1" is written, pit 180 is formed as shown in FIG. 5A. When "0" is written, a merely slight trace remains on the surface of the storage medium 150 as shown in FIG. 5B. The difference between the traces of "0" and "1" is apparent.

Figure 6A:
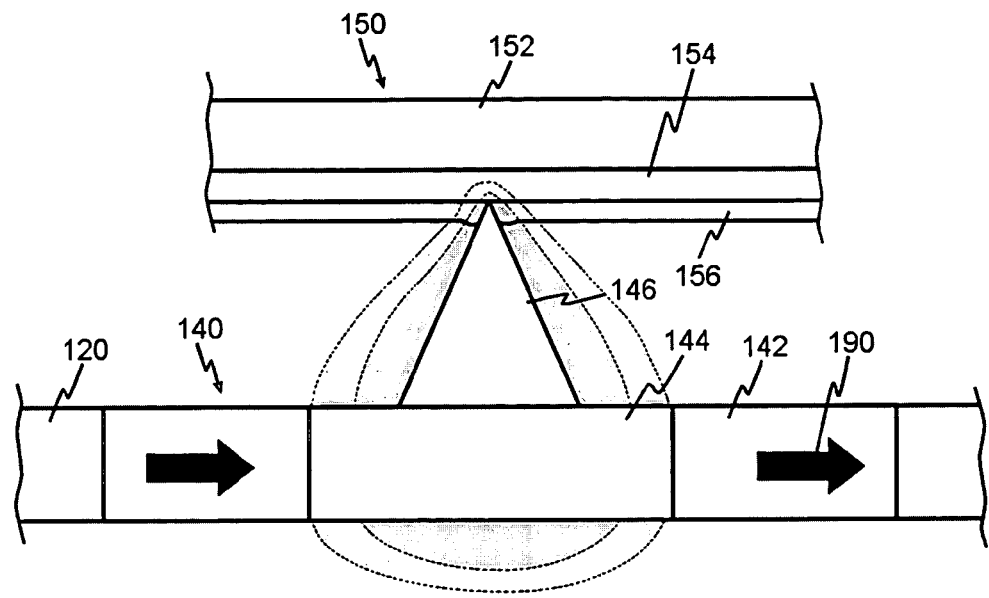
FIGS. 6A and 6B illustrate reading the bits "1" and "0" by the device illustrated in FIG. 1.
Figure 6B:
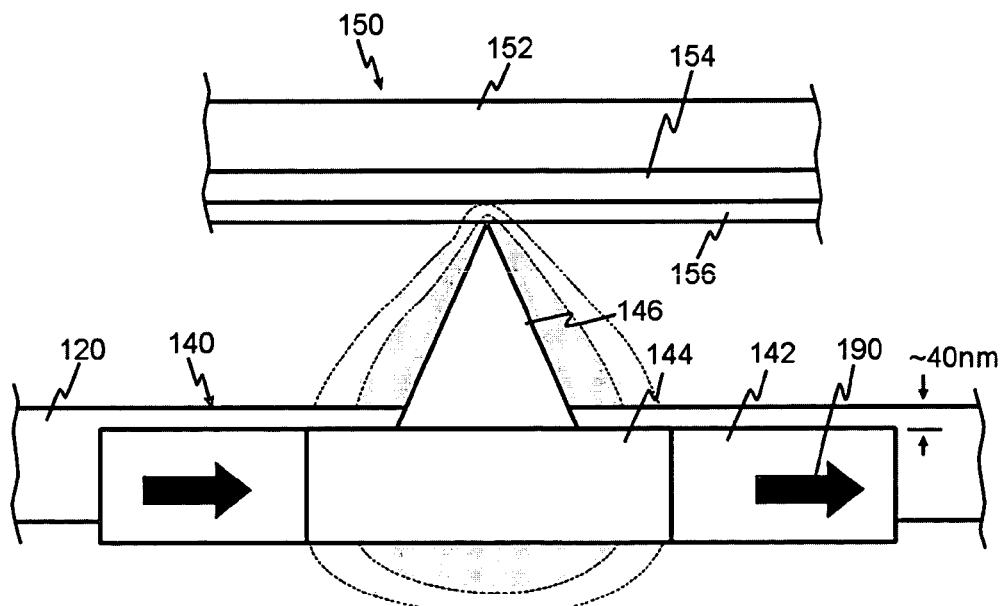

FIGS. 6A and 6B illustrate reading "1" and "0" by the device illustrated in FIG. 1. In both cases, the gap between the tip 146 of the cantilever 140 and the storage medium 150 is equal in both bit writing and bit reading. The tip 146 is aligned at a corresponding bit position of the storage medium 150. When reading "0", the cantilever 140 is moved or transformed because there is no pit. The maximum transformation distance of the tip 146 is equal or approximate to the thickness of the PMMA layer 156. The transformation distance is shown as 40 nm or less in FIG. 6B. When reading "1", the tip 146 is not subject to transformation force. The data reading is performed by sensing a resistance change depending on the transformation of the cantilever 140. A current 190 applied for reading is lower than for writing.

Figure 7:
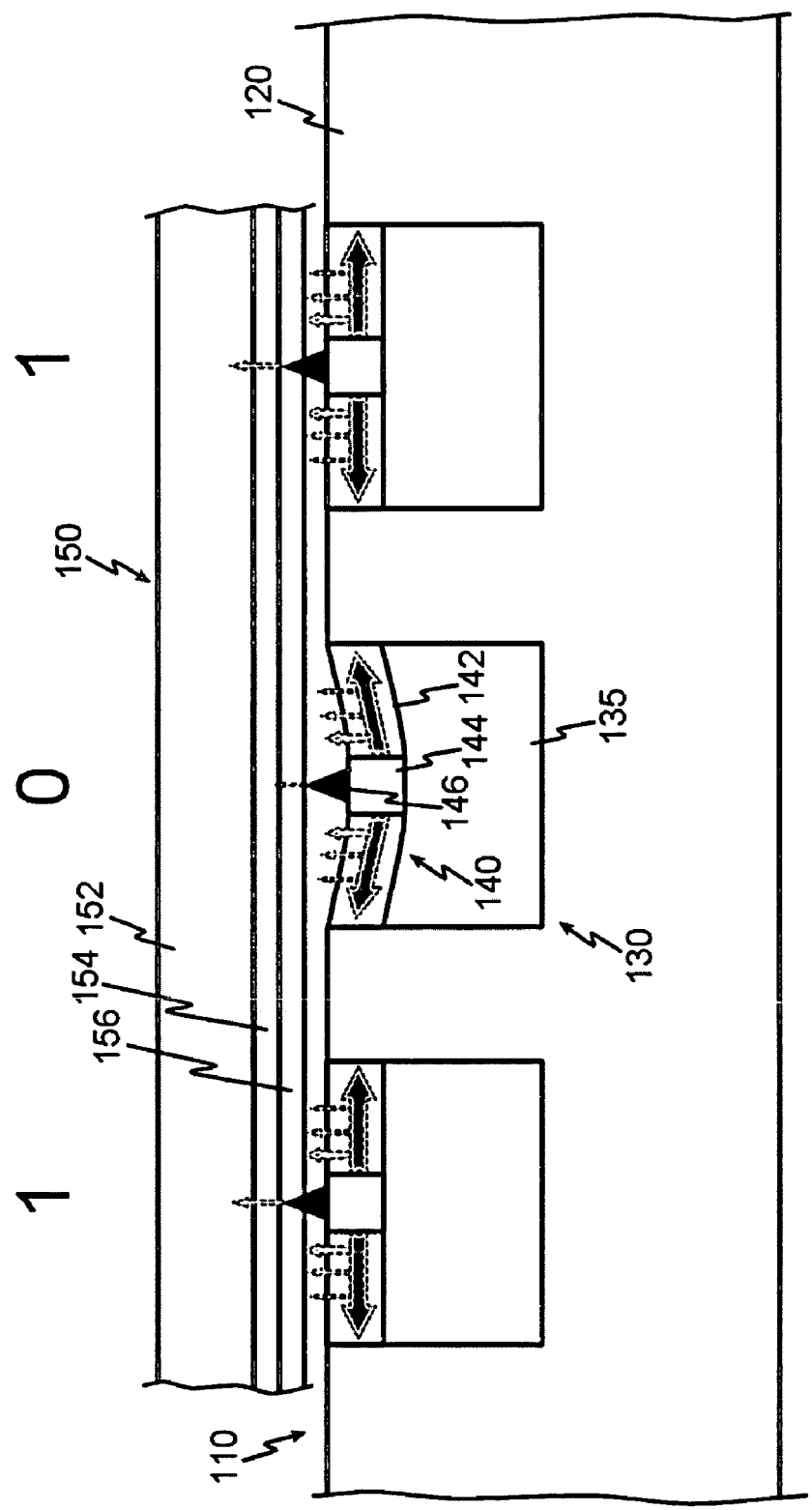
FIG. 7 depicts heat transfer difference when the bits "1" and "0" are read by the device illustrated in FIG. 1.

FIG. 7 depicts heat transfer difference between "1" reading and "0" reading. Referring to FIG. 7, the tip 146 needs to contact the storage medium 150 to read data. When the tip 146 is inserted in a pit, heat flow increases. The cause is heat contact with the pit and heat transfer to the legs 142 except the tip 146 and thus to the storage medium 150 via the air. If the cantilever 140 is not very flexible, the wear of the PMMA layer 156 is small enough and thus repeated data reading is possible. Otherwise, the PMMA layer 156 will be worn out soon. In the former case, the storage device 100 can be used to a device for reading data repeatedly after writing, such as a flash memory for a digital camera. Nevertheless, since the tip 146 pressing the PMMA layer 156 is at a low temperature, damage is not readily done to the PMMA layer 156.

Figure 8:
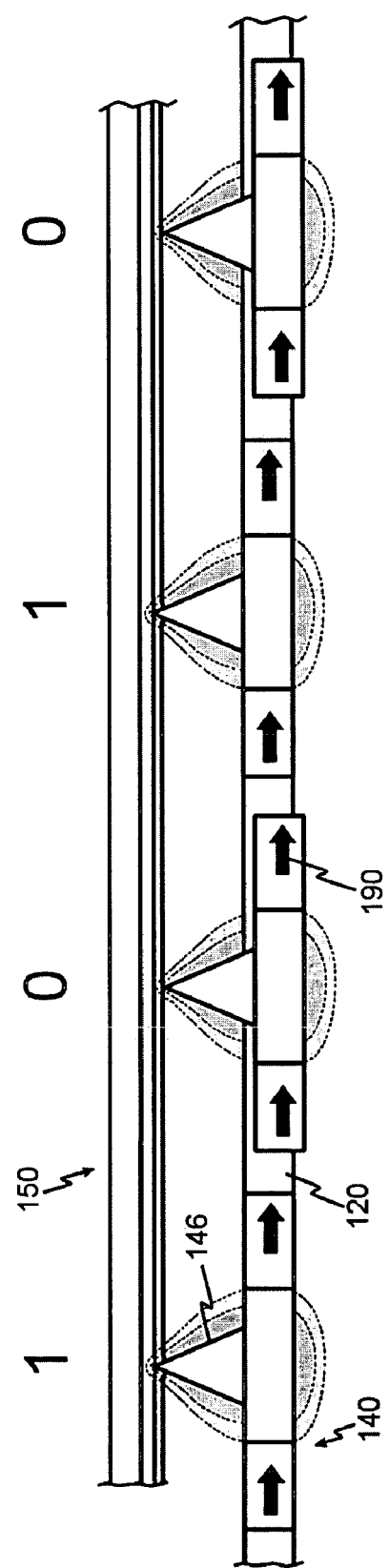
FIG. 8 illustrates reading of one 4-bit word by the device illustrated in FIG. 1.

FIG. 8 illustrates reading of one 4-bit word. Referring to FIG. 8, four tips 146 are in contact with the surface of the storage medium 150 and a current 190 is applied to them, for data reading. Cantilevers 140 for reading 0s are transformed and a change in the resistance of the cantilevers 140 is sensed. Thus, 0s are read.

Figure 9:
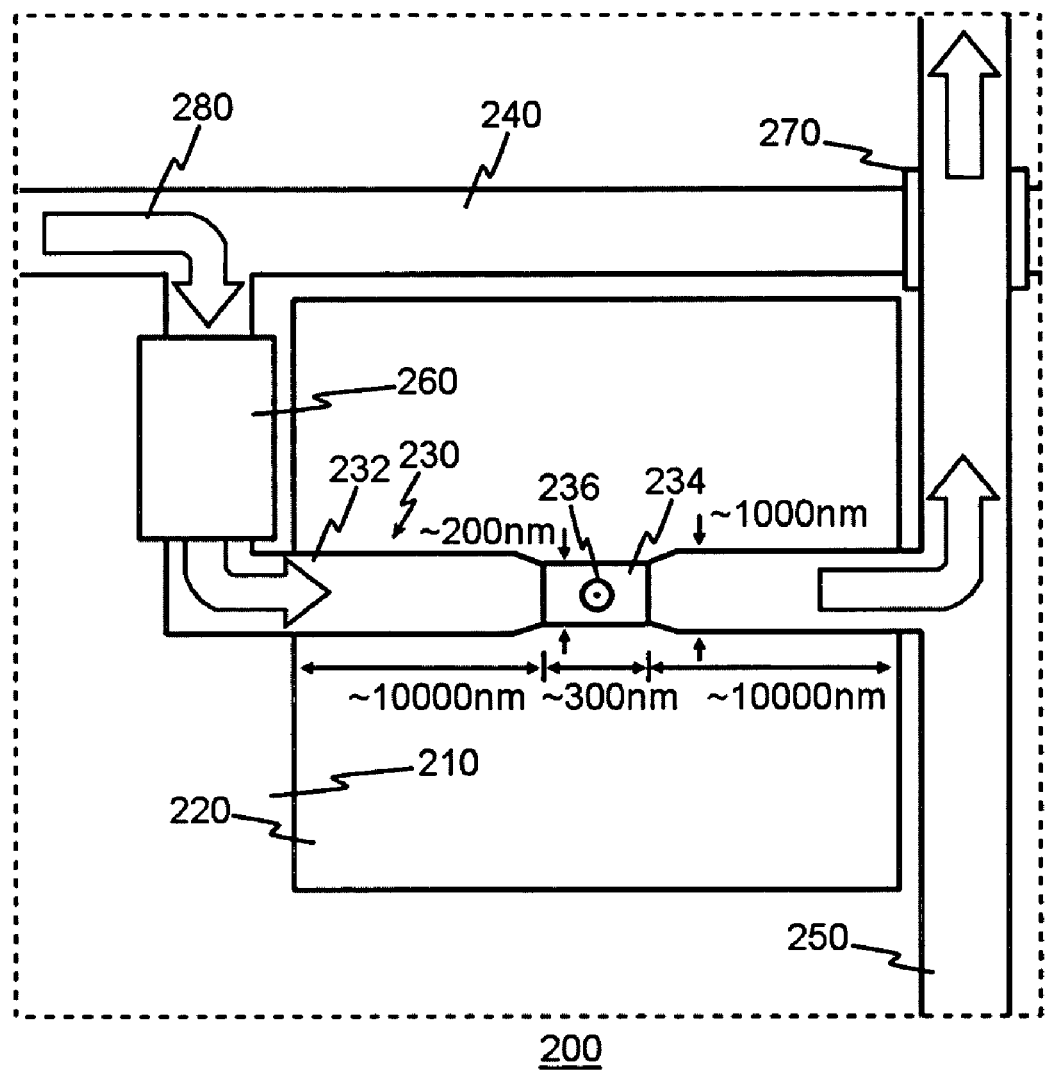
FIG. 9 illustrates a cross beam-type cantilever cell according to an embodiment of the present invention.

FIG. 9 illustrates a cross-beam type cantilever cell according to an embodiment of the present invention. Referring to FIG. 9, a cantilever cell 200 is comprised of an opening 220 at the center of a substrate 210, a cantilever 230 crossing the opening 220, a horizontal address line 240 for applying a current 280 to the cantilever 230, a vertical address line 250 for conducting the current 280 through the cantilever 230 to the outside the cantilever cell 200, and a Schottky diode 260 in the path of the horizontal address line 240, for rectifying the input current 280. The substrate 210 is formed of silicon and the horizontal and vertical address lines 240 and 250 are formed of doped silicon. In the thus-constituted cantilever cell 200, the cantilever 230 is less elastic and stronger than a later-described cantilever according to another embodiment of the present invention. In the cantilever 230, a heater platform 234 is 300 nm long. Legs 232 of the cantilever 230 are 10,000 nm long, 100 nm wide, and 200 nm thick. A tip 236 of the cantilever 230 is 200 nm high.

Figure 10:
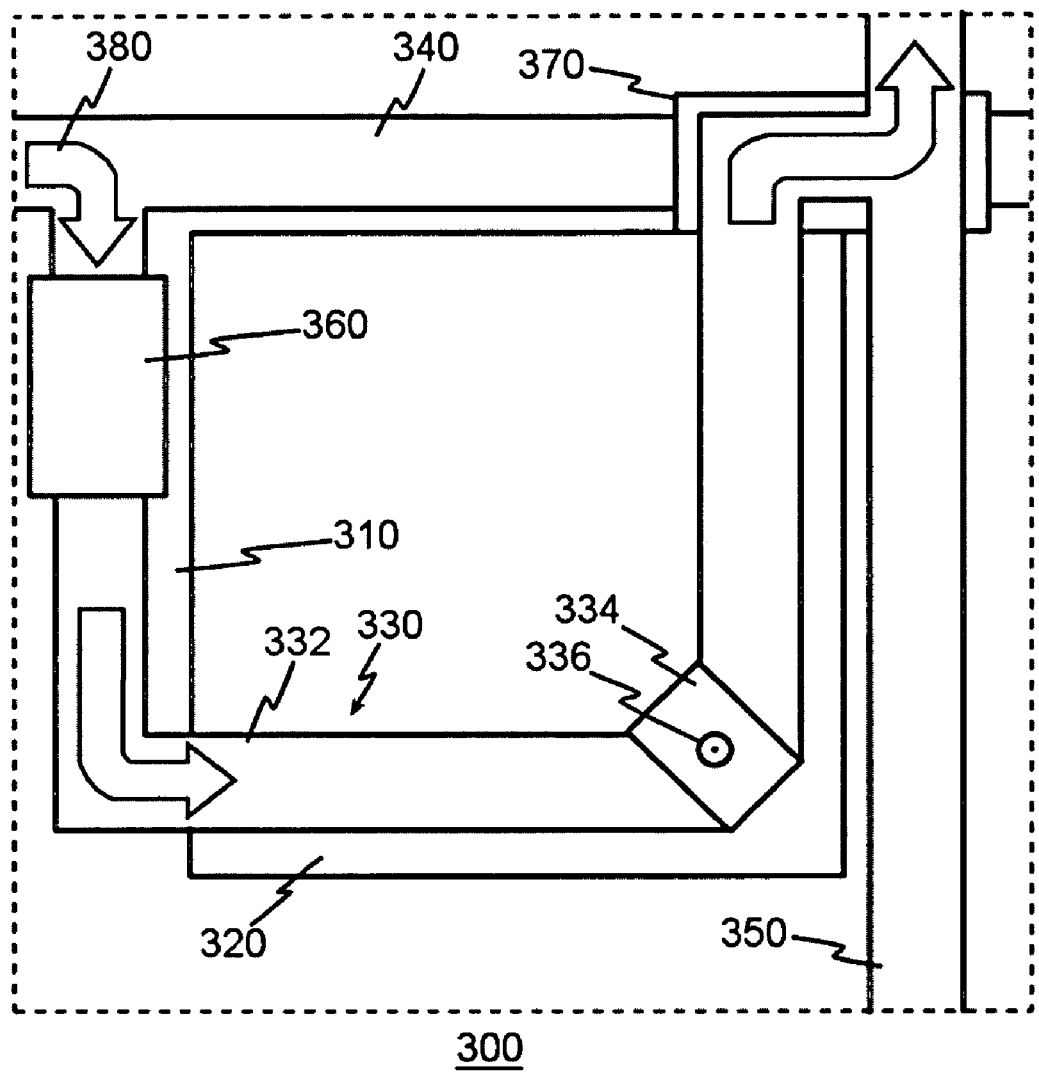
FIG. 10 illustrates a cantilever cell according to another embodiment of the present invention.

FIG. 10 illustrates a cantilever cell according to another embodiment of the present invention. Referring to FIG. 10, a cantilever cell 300 is comprised of an opening 320 at the center of a substrate 310, an "L"-shaped cantilever 330 crossing the opening 320, a horizontal address line 340 for applying a current 380 to the cantilever 330, a vertical address line 350 for conducting the current 380 through the cantilever 330 to the outside the cantilever cell 300, and a Schottky diode 360 in the path of the horizontal address line 340, for rectifying the input current 380. The substrate 310 is formed of silicon and the horizontal and vertical address lines 340 and 350 are formed of doped silicon. In the thus-constituted cantilever cell 300, the cantilever 330 is more elastic and less strong than the cantilever 230 illustrated in FIG. 9.

Cantilever cells 200 or 300 can be arranged in a matrix to form a cantilever chip.

Figure 11:
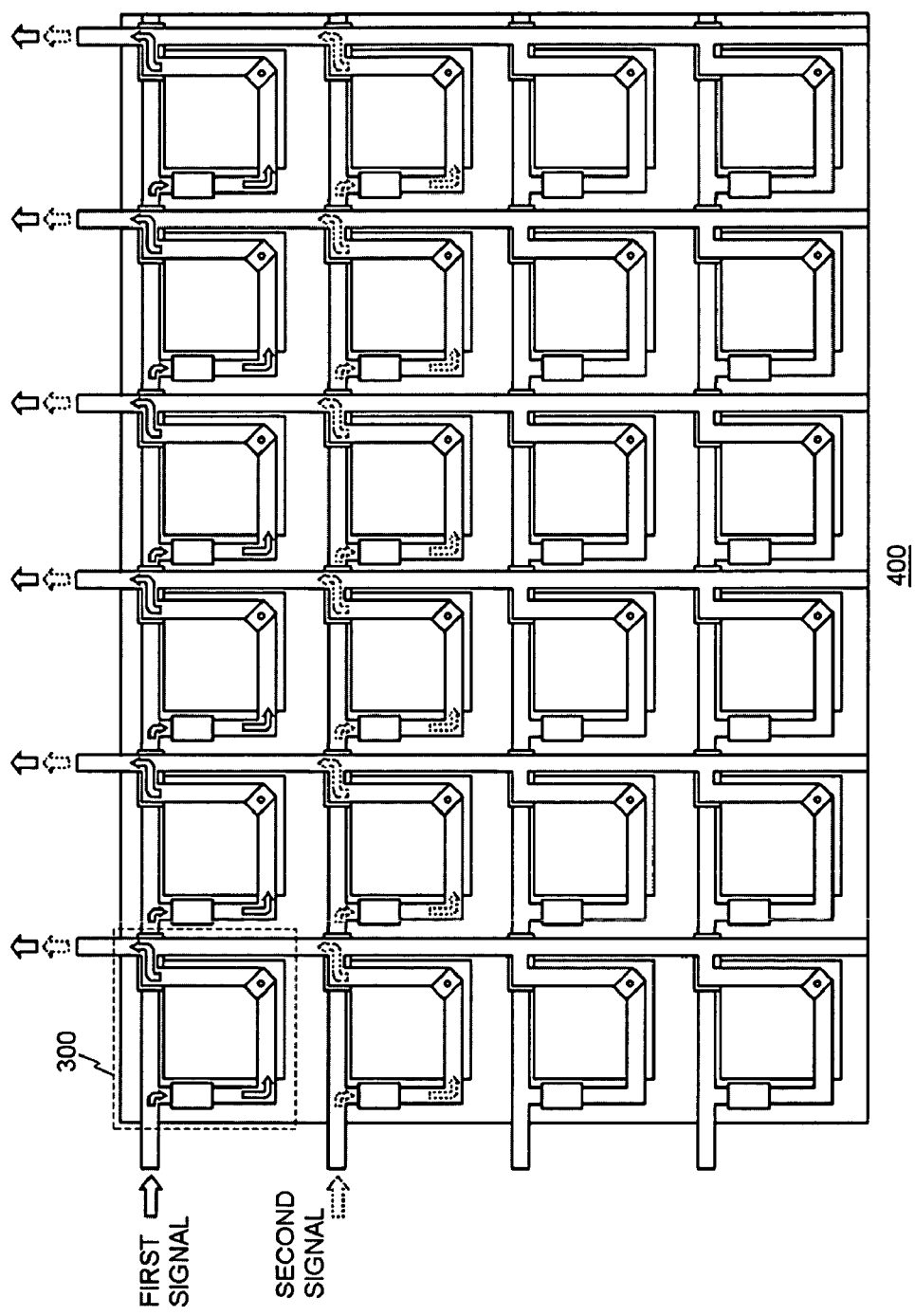
FIG. 11 illustrates a 4×6 matrix of cantilever cells illustrated in FIG. 10.

FIG. 11 illustrates a 4×6 matrix of cantilever cells illustrated in FIG. 10. Referring to FIG. 11, a cantilever chip 400 writes data stepwise. For example, when data is written by cantilevers in first and second rows, tips 336 in the first row are heated by feeding a signal to a horizontal address line 340 in the first row, which then form pits on a storage medium (not shown). The chip 300 then recedes from the storage medium and the PMMA layer of the storage medium is cooled down to a temperature where the layer is not damaged by the tip 336. Tips 336 in the second row are then heated by feeding a signal to a horizontal address line 340 in the second row and form pits on the storage medium. The chip 300 then recedes from the storage medium and the PMMA layer of the storage medium is cooled down to a temperature where the layer is not damaged by the tip 336.

Modifications of the cantilever chip 400 with increased data writing speeds will be described below.

Figure 12:
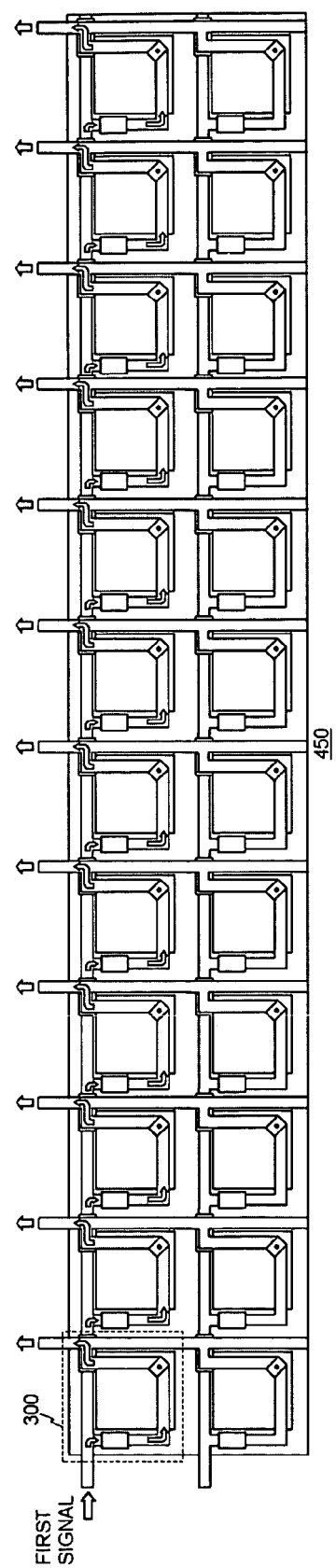
FIG. 12 illustrates a first modification of the cantilever chip illustrated in FIG. 11 to increase a data writing speed.

FIG. 12 illustrates a first modification of the cantilever chip illustrated in FIG. 11 to increase a data writing speed. Referring to FIG. 12, a cantilever chip 450 has more columns and less rows than the cantilever chip 400 illustrated in FIG. 11. That is, the cantilever chip 450 has cantilever cells 300 in a 2×2 matrix. A data writing speed can be increased by writing a 12-bit word by one write operation.

Figure 13:
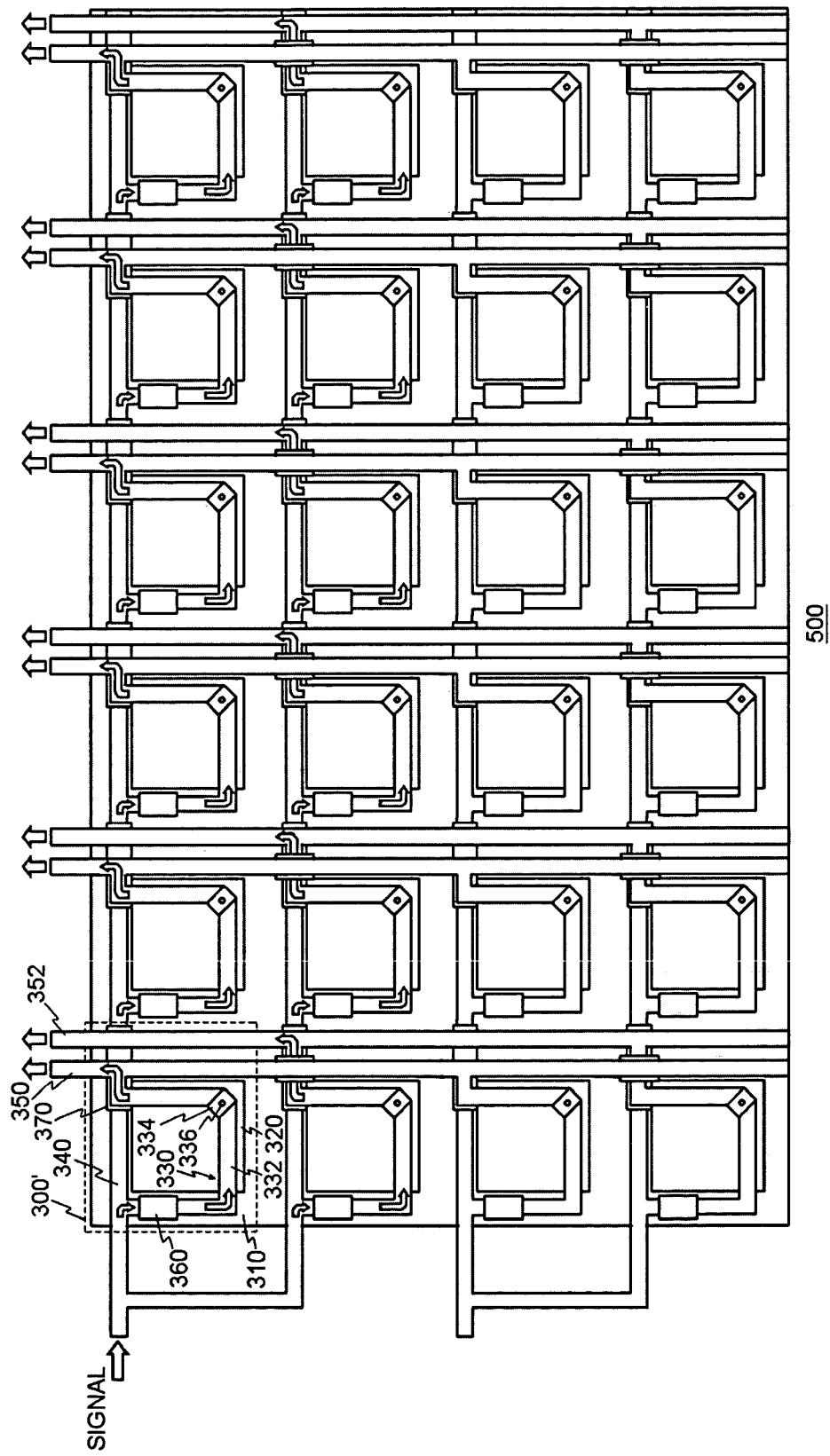
FIG. 13 illustrates a second modification of the cantilever chip illustrated in FIG. 11 to increase a data writing speed.

FIG. 13 illustrates a second modification of the cantilever chip 400 to increase a data writing speed. Referring to FIG. 13, since each pair of rows share one horizontal address line 340 and an additional vertical address line 352 is provided to each column in a cantilever chip 500, the vertical address lines 350 serve odd-numbered rows, while the vertical address lines 352 serve even-numbered rows. Each cantilever cell 300' further has a vertical address line 352, as compared to the cantilever cell 300 illustrated in FIG. 10. The cantilever chip 500 also has an increased data writing speed by writing a 12-bit word by one write operation.

Figure 14:
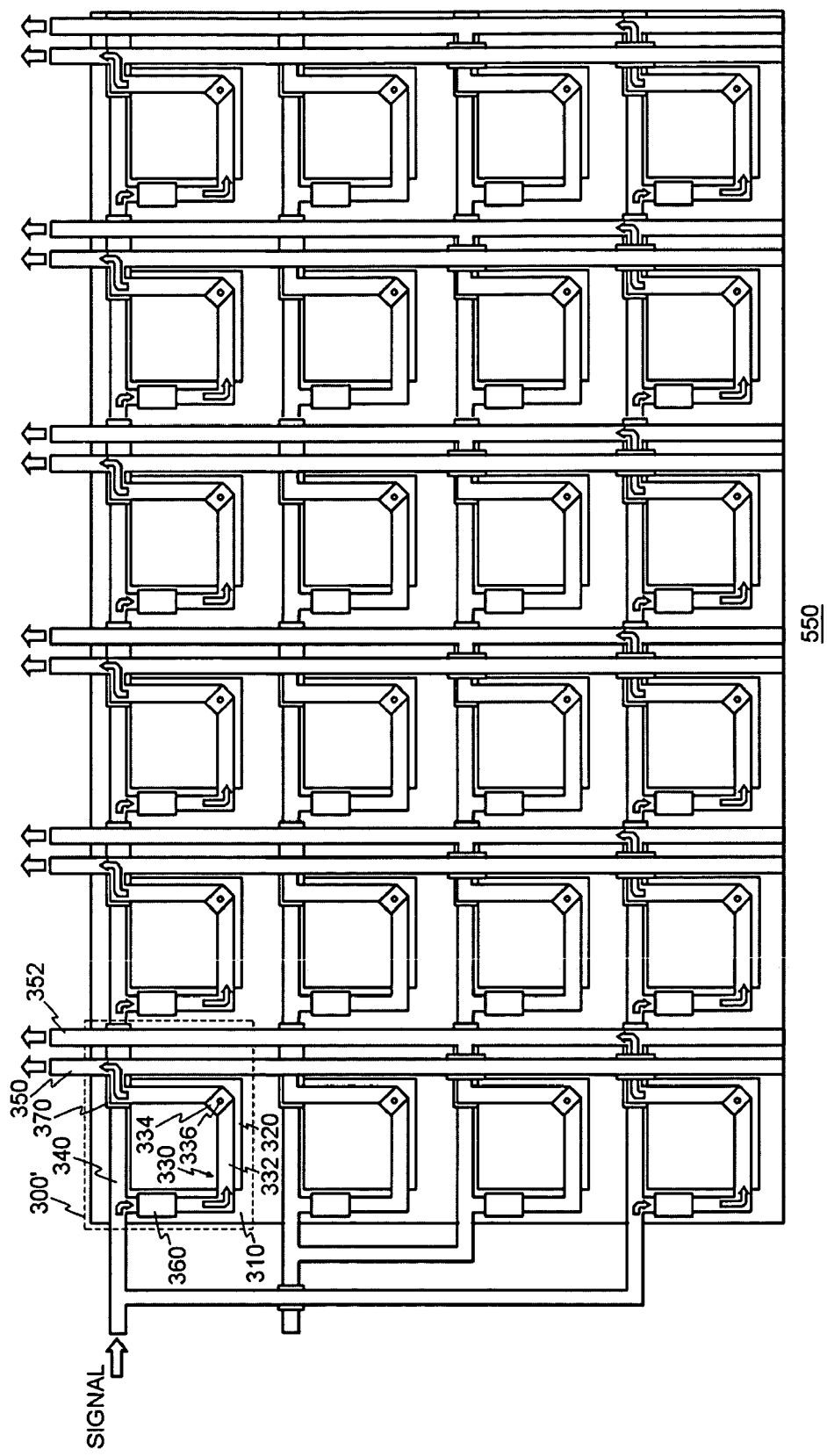
FIG. 14 illustrates a third modification of the cantilever chip illustrated in FIG. 11 to increase a data writing speed.

FIG. 14 illustrates a third modification of the cantilever chip 400 illustrated in FIG. 11 to improve a data writing speed. A cantilever chip 550 is similar to the basic structure illustrated in FIG. 11. In the cantilever chip 550, each pair of rows symmetrical in a column direction share one horizontal address line 340 and an additional vertical address line 352 is provided to each column, so that the vertical address lines 350 are used for the first and fourth rows, and the vertical address lines 352 are used for the second and third rows. In addition to the advantage of increasing the writing speed by writing a 12-bit word by one write operation, the cantilever chip 550 has an improved parallel degree with a storage medium by symmetrically distributing force applied to the chip 550 to the storage medium.

Figure 15:
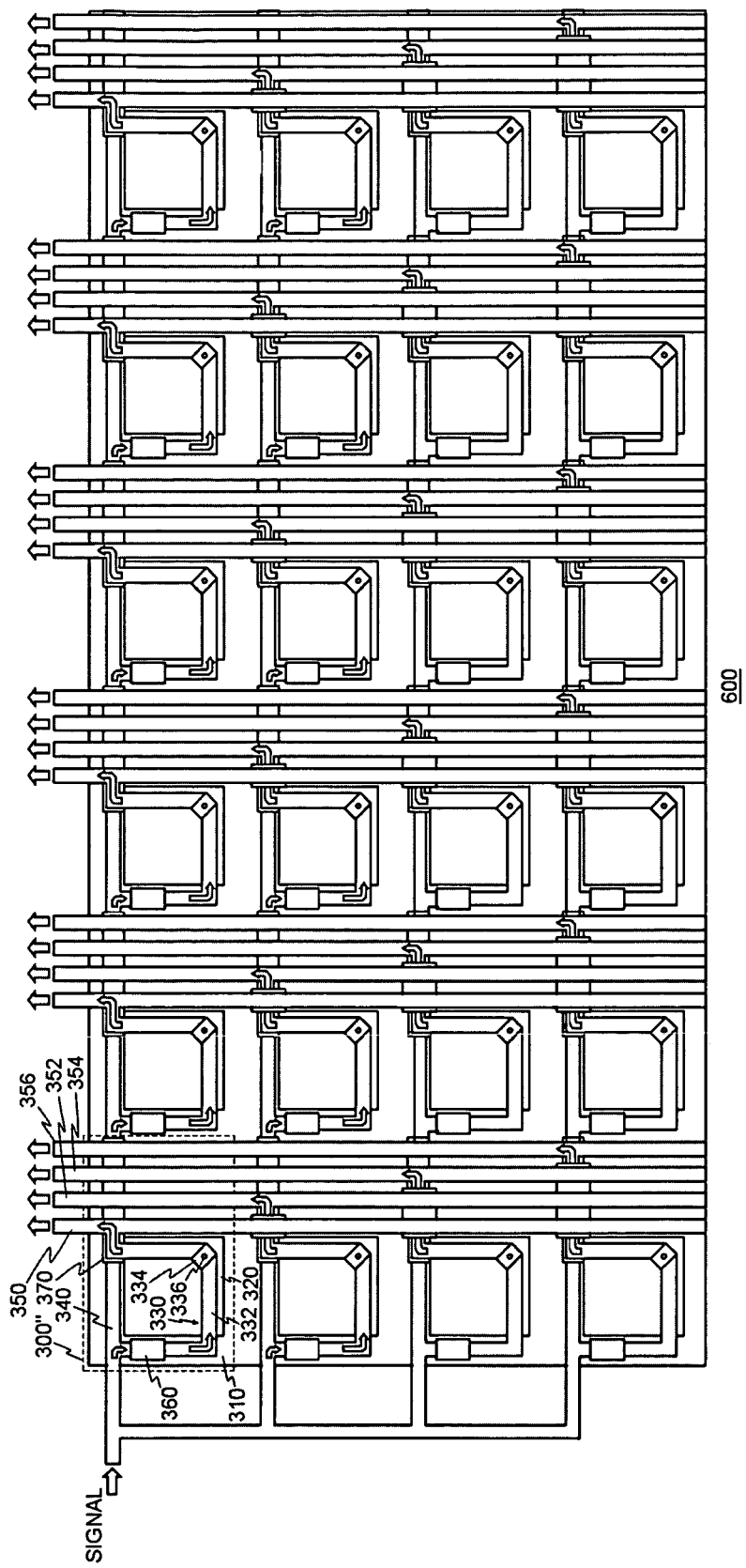
FIG. 15 illustrates a fourth modification of the cantilever chip illustrated in FIG. 11 to increase the data writing speed.

FIG. 15 illustrates a fourth modification of the cantilever chip 400 illustrated in FIG. 11 to improve a data writing speed. As compared to the basic structure, in a cantilever chip 600, all rows share one horizontal address line 340 and three additional vertical address line 352, 354, and 356 are provided to each column, so that each row has a difference vertical address line. Each cantilever cell 300" has the three vertical address lines 352, 354 and 356 in addition to the components of the cantilever cell 300 illustrated in FIG. 10. This cantilever chip 600 can write a 24-bit word by one write operation, thereby increasing the data writing speed.

Aside from the structure of a cantilever chip, a storage medium can be modified to increase the data writing speed.

Figure 16:
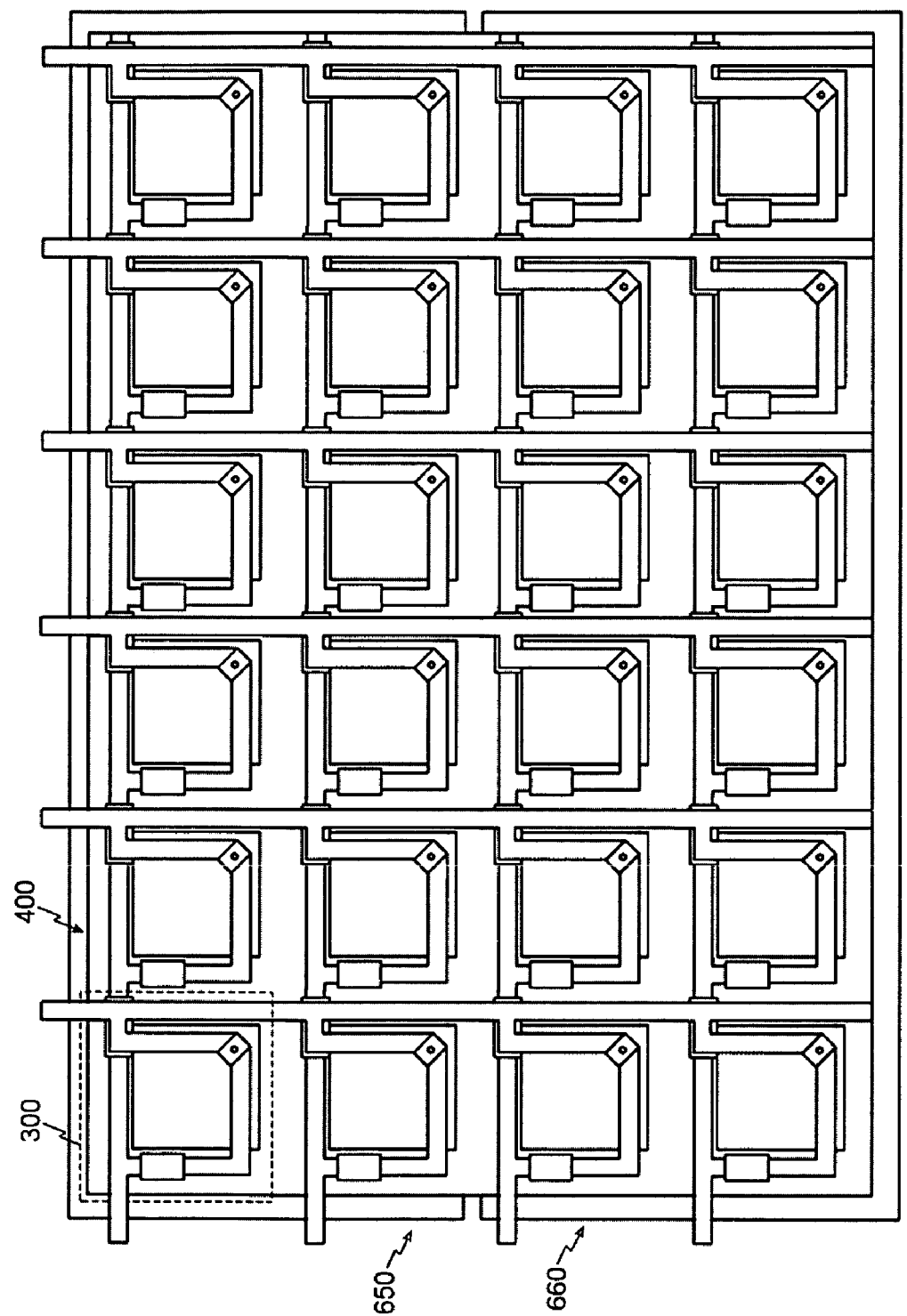
FIG. 16 illustrates a method of increasing the data writing speed using the cantilever chip illustrated in FIG. 11.

FIG. 16 depicts a method of increasing the data writing speed using the cantilever chip illustrated in FIG. 11. Referring to FIG. 16, there are two storage mediums 650 and 660 and the cantilever chips 400 is mounted on the storage mediums 650 and 660. The first storage medium 650 is aligned with the first and second rows of the cantilever chip 400, and the second storage medium 660 is aligned with the third and fourth rows of the cantilever chip 400. To write data, a signal is applied to a horizontal address line 340 in the first row and then to a horizontal address line 340 in the third rows, for example. If a cantilever chip having 2M rows mounted on M storage mediums, the data write operation is done in the same manner. That is, a signal is applied first to a horizontal address line in the first row, to a horizontal address line in the third row, and then to a horizontal address line in a fifth row. This writing method advantageously increases an overall data writing speed since it is unnecessary to cool down tips and one storage medium when data is written on another storage medium after data writing is completed on the storage medium.

In relation to energy provided to a cantilever chip, the data writing speed can be increased.

Figure 17:
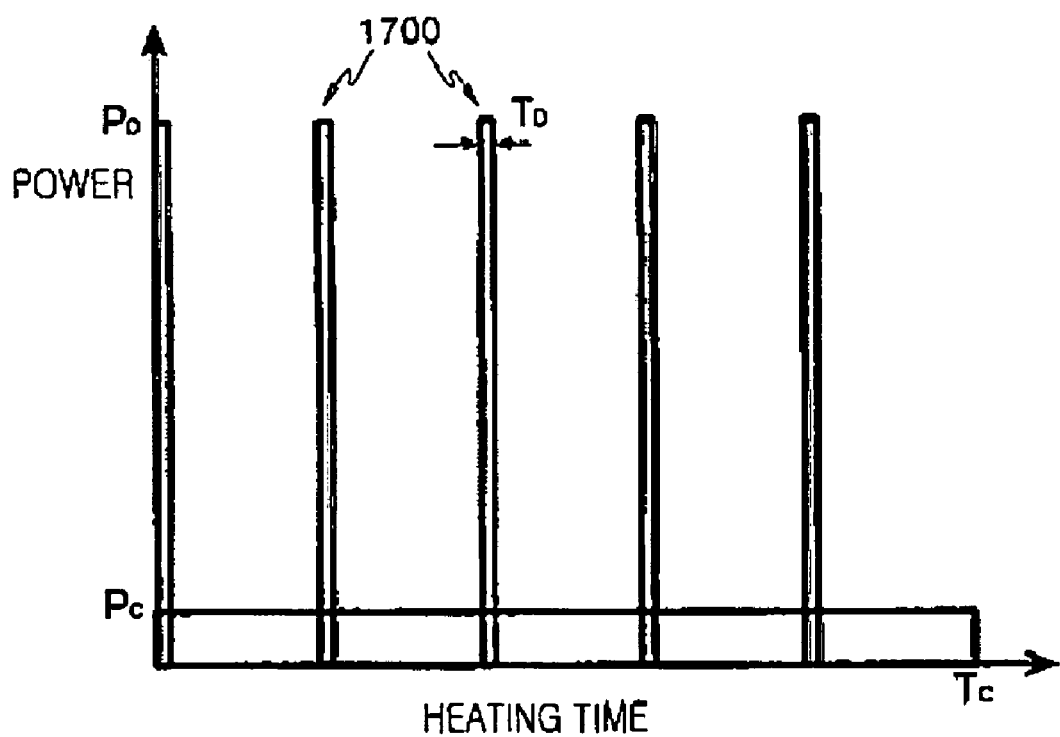
FIG. 17 is a graph illustrating a method of increasing the data writing speed by sharply increasing an energy level.

FIG. 17 is a graph illustrating a method of increasing the data writing speed by sharply increasing an energy level. Referring to FIGS. 11 and 17, an energy spike 1700 is provided to each tip 336 in each row, sequentially scanning all rows for one data write period. The energy (PD×TD) of one energy spike 1700 for one tip 336 must be less than the heat energy (PC×TC) required for data writing, and the duration (TD) of the energy spike must be much shorter than time (TC) required for the data writing. Time required to scan all cells 300 must be equal to an optimum time (TC) for one-bit writing, and energy provided to one tip by a plurality of energy spikes 1700 must be equal to optimum energy required for the data writing. For example, the power (PD) of one energy spike 1700 is the product (PD≈Nrows×Pc) of the number (Nrows) of rows in the cantilever chip 400 and optimum power (Pc) required for one-bit writing, and the duration of one energy spike 1700 (TD≈ Tc×Nrows) is the quotient of dividing the optimum time (TC) for one-bit writing by the number (Nrows) of rows in the chip 400. In other words, one bit is heated a plurality of times, instead of writing data by heating one bit at one time.

FIGS. 18 to 26 sequentially illustrate a method of fabricating a plurality of cantilevers according to the present invention.

Figure 18:
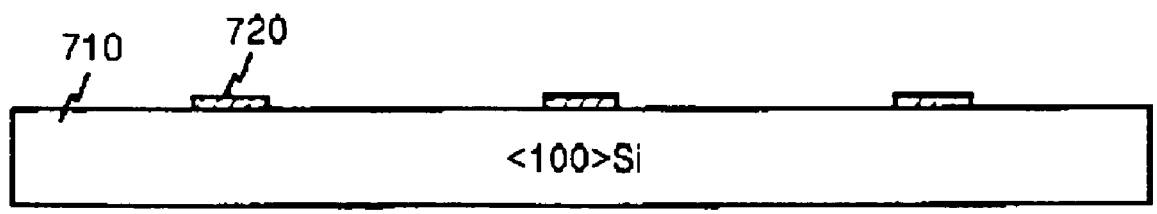
FIGS. 18 to 26 sequentially illustrates a method of fabricating a plurality of cantilevers according to the present invention.

Referring to FIG. 18, a photoresist layer 720 having tip pattern is coated on a silicon substrate 710.

Figure 19:
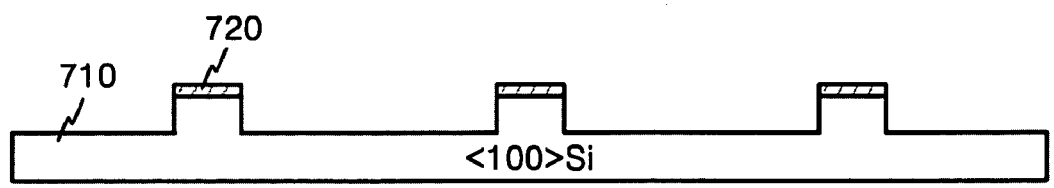

Referring to FIG. 19, the substrate 710 is anisotropic-plasma-etched to remove portions uncoated with the photoresist layer 720.

Figure 20:
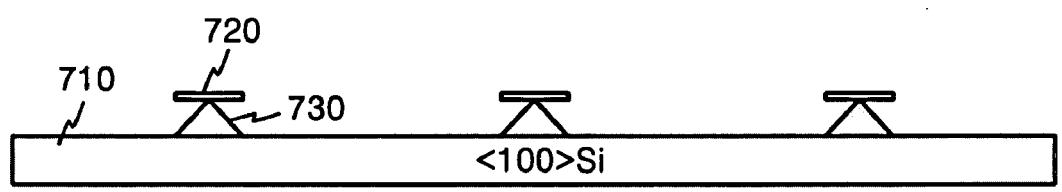

Referring to FIG. 20, the hexahedrons resulting from the plasma etching are formed into tips 730 by isotropic-liquid-etching the substrate 710.

Figure 21:
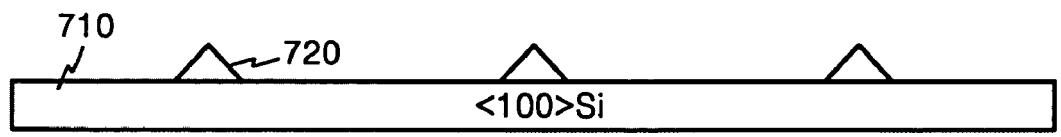

Referring to FIG. 21, the photoresist layer 720 remaining on the tips 730 is removed.

Figure 22:
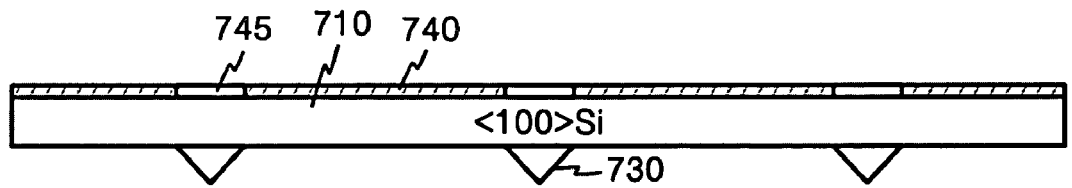

Referring to FIG. 22, a photoresist layer 740 having slits 745 vertically aligned with the tips 730 in wiring areas are coated on the opposite surface of the substrate 710.

Figure 23:
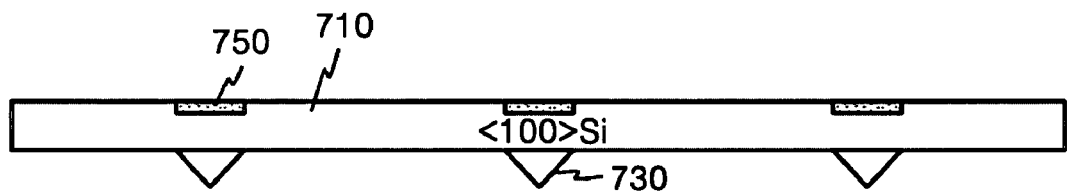

Referring to FIG. 23, the wiring areas 750 are subject to silicon doping by diffusing a dopant such as boron through the slits 745 and the photoresist layer 740 is removed.

Figure 24:
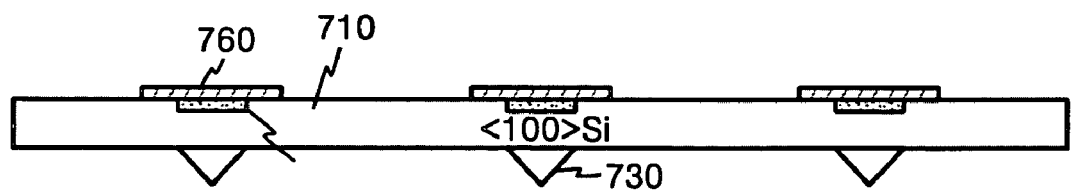

Referring to FIG. 24, a photoresist layer 760 having heater platform patterns is coated on the substrate 710.

Figure 25:
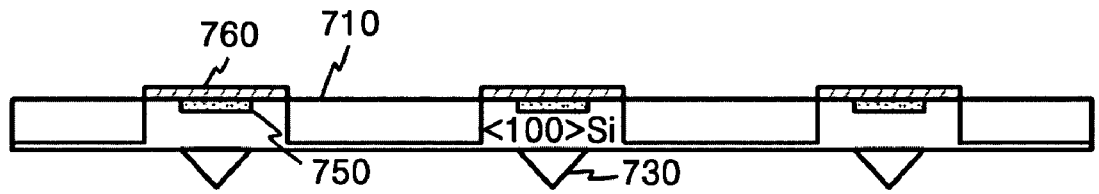

Referring to FIG. 25, areas uncoated with the photoresist layer 760 are etched to a predetermined depth by anisotropic-plasma-etching the substrate 710.

Figure 26:
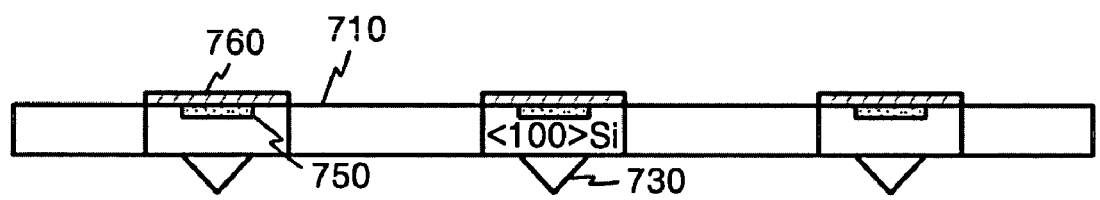

The step illustrated in FIG. 25 can be replaced by the step illustrated in FIG. 26. Referring to FIG. 26, all the areas uncoated with the photoresist layer 760 are etched away by anisotropic-plasma-etching the substrate 710.

As described above, in the inventive nanoscale digital data storage device, corresponding cantilever tips are in contact with the surface of a storage medium when "1" and "0" are written. Therefore, there is no need for forcibly transforming each cantilever.

Furthermore, since "0" is written at the same bit position as "1", energy efficiency is increased as compared to the conventional writing method in which the overall surface of a storage medium is heated.

Owing to the above advantages, the nanoscale digital data storage device is so simplified as to be feasible for mass production.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A nanoscale digital data storage device comprising:
   a storage medium having a polymer layer deposited on a first substrate, for writing and reading digital data to and from; and
   a cantilever chip having cells,
   wherein each of the cells comprises:
   an opening at a center portion of the cell;
   a cantilever formed across the opening and having an electrically resistive platform having a tip formed on a surface thereof and emitting heat according to an applied current, and a leg connecting the platform to a second substrate of the cantilever chip;
   at least one horizontal address line for applying current to the cantilever; and
   a vertical address line for conducting current outside of the cantilever,
   wherein the tips in the cantilever chip are in contact with the storage medium at predetermined bit positions during data writing, and the cantilever chip applies a relatively low current to a tip when the tip writes bit 1 and a relatively high current to the tip when the tip writes bit 0.

2. The nanoscale digital data storage device of claim 1, wherein the polymer layer includes:
   a photoresist layer deposited on the first substrate; and
   a polymethylmethacrylate (PMMA) layer deposited on the photoresist layer, for writing and reading digital data to and from.

3. The nanoscale digital data storage device of claim 1, further comprising a stage for three-dimensionally moving the storage medium to adjust the relative position of the storage medium with respect to the cantilever chip.

4. The nanoscale digital data storage device of claim 1, wherein each of the cells further comprises a Schottky diode formed in the path of the horizontal address line, for rectifying the current.

5. The nanoscale digital data storage device of claim 1, wherein current is applied sequentially to all the tips in a column direction during data writing.

6. The nanoscale digital data storage device of claim 1, wherein current is applied sequentially to all the tips in a column direction for a plurality of times during data writing.

* * * * *